(12) United States Patent  (10) Patent No.: US 7,526,801 B2
Ballinger et al.  (45) Date of Patent: Apr. 28, 2009

(54) BULK TRANSMISSION OF MESSAGES USING A SINGLE HTTP REQUEST

(75) Inventors: Keith W. Ballinger, North Bend, WA (US); Luis Felipe Cabrera, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 905 days.

(21) Appl. No.: 11/031,856

(22) Filed: Jan. 7, 2005

(65) Prior Publication Data

US 2006/0236387 A1   Oct. 19, 2006

(51) Int. Cl.
*G06F 9/00* (2006.01)
(52) U.S. Cl. ....................................................... 726/14
(58) Field of Classification Search .................. 726/14
See application file for complete search history.

(56) References Cited

U.S. PATENT DOCUMENTS

| 6,219,790 | B1* | 4/2001 | Lloyd et al. ................... 726/14 |
| 6,529,937 | B1* | 3/2003 | Murphy et al. ............... 709/203 |
| 6,681,327 | B1* | 1/2004 | Jardin ........................ 713/153 |
| 2002/0099795 | A1* | 7/2002 | Betros et al. ................. 709/219 |
| 2002/0184371 | A1* | 12/2002 | Elonen et al. ................ 709/227 |
| 2003/0097448 | A1* | 5/2003 | Menezes et al. ............. 709/227 |
| 2003/0105805 | A1  | 6/2003 | Jorgenson |
| 2006/0264202 | A1* | 11/2006 | Hagmeier et al. ........... 455/411 |

FOREIGN PATENT DOCUMENTS

EP      1-244-269 A2      9/2002

OTHER PUBLICATIONS

EP Search Report; Munich, Mar. 17, 2006.

\* cited by examiner

*Primary Examiner*—Kambiz Zand
*Assistant Examiner*—Teshome Hailu (57) ABSTRACT

Example embodiments provide for keeping an HTTP reply flow for a communication open such that portions of an overall response corresponding to a single request may be sent across the HTTP reply flow. As the various portions of the overall response become available at a corresponding service endpoint, the service appropriately encapsulates the messages and sends them to the requesting endpoint. The recipient or requesting endpoint of the response is then capable of reading the available portions of the response and appropriately decodes the embedded portions and is free to process these as appropriate. Accordingly, because only one request is made for several portions of a response valuable system resource are reserved for only requiring one authentication and/or validation of a requesting endpoint.

16 Claims, 4 Drawing Sheets

BULK TRANSMISSION OF MESSAGES USING A SINGLE HTTP REQUEST

CROSS-REFERENCE TO RELATED APPLICATIONS

N/A

BACKGROUND OF THE INVENTION

1. The Field of the Invention

The present invention generally relates to message transfer between computing systems using an HTTP request-response type communication. More specifically, the present invention provides for transferring an HTTP response between endpoints as a plurality of different portions in order to conserve valuable system resources associated with validating and authorizing a corresponding HTTP request and to provide two-way communication to a requester in environments where that may not be possible otherwise.

2. Background and Related Art

Computer networks have enhanced our ability to communicate and access information by allowing one computer or device (herein after referred to as "computing system") to communicate over a network with another computing system using electronic messages. When transferring an electronic message between computing systems, the electronic message will often pass through a protocol stack that performs operations on the data within the electronic message (e.g., packtizing, routing, flow control, etc.). The Open System Interconnect (OSI) model is an example of a networking framework for implementing such a protocol stack.

The OSI model breaks down the operations for transferring an electronic message into several distinct "layers," each designated to perform certain operations in the data transfer process. While protocol stacks can potentially implement each of the layers, many protocol stacks implement only selective layers for use in transferring data across a network. For example, when data is transmitted from a computing system it originates at the application layer and is passed down to intermediate lower layers and then onto a network. When data is received at a computing device from a network, it enters the physical layer and is passed up to higher intermediate layers and then eventually received at the application layer. The application layer, the uppermost layer, is responsible for supporting applications and end-user processes. Another layer incorporated by most protocol stacks is the transport layer. An example of a transport layer is the Transmission Control Protocol (TCP).

In a distributed system (e.g., a Web Services environment), services and request for services are frequently transported using (HTTP). HyperText Transfer Protocol operates between the application layer and other lower layers of the OSI model to facilitate the transfer of content in a distributed system environment. Like most network protocols, HTTP uses the client-server model. More particularly, a client computer system (herein after referred as a "client" or "requesting" endpoint) opens a connection and sends a request message over a request flow to a server (herein after referred to as a "server" or "service" endpoint). The server then returns a response message usually containing the resource that was request (e.g., a file, a dynamically-generated query result, or other similar chunk of data) over a reply flow of the HTTP communication. After delivering the response, the server closes the connection; making HTTP a stateless protocol, i.e., not maintaining any connection information between transactions.

Because HTTP is a stateless protocol, HTTP authentication does not support the concept of a session—where a user would login and/or logout. Accordingly, each request to access content that is transported via HTTP (i.e., an HTTP request) must include appropriate HTTP authentication information. As such, there is a tremendous amount of overhead associated with processing the authentication information and validating the client for each request received at a service endpoint.

For example, typically HTTP protocol provides for authentication information to be supplied with each HTTP request via a special header, which is typically in the format of an authentication-type and credentials. The way the client obtains and transmits these credentials is as follows. The first time a client tries to access a website or other such service that requires authentication, the service will typically refuse to provide the requested content or information and will return to the client an HTTP error message (e.g., an unauthorized message) as well as some form of challenge. When the client receives this message it will need to appropriately respond to the challenge using the proper credentials in order to access the service resources. For example, the client upon receiving the challenge may present a user with a popup dialog box that requests a username and/or password. Alternatively, or in conjunction, the challenge may require some other type of credential like a token, e.g., an X.509, Kerberos or other similar token(s). Further, other types of challenges may also be applicable.

Regardless of the type of challenge, after the user (or the client as the case may be) provides the proper credentials (e.g., by typing in a correct password), the client may transmit the original HTTP request to the server; but it may add the authorization header that now includes the credentials as an argument of the header label. If the service accepts the included credentials and returns valid content, the client typically caches these credentials and retransmits them with each new request to the same service or derivative service associated with the same content.

During large file transfers or requests that take relatively large time to process (e.g., a loan process) several requests are made in order to transfer the entire file or process the overall request. This is due in large part to the nature of HTTP, wherein clients are considered un-addressable in that no data can be sent to them without sending it across a reply flow corresponding to the request. Accordingly for large files and overall requests that take time to process, the client must continually send requests that include the authentication information; and the service must continually process such authentication credentials and return the appropriate portions of the overall request as they become available.

This continual authentication and validation process for each request consumes valuable system resources that could be utilized elsewhere (e.g., in the processing the overall response). Similarly, the processing of continued requests associated with the rigidity of firewalls also consumes valuable system resources. As such, there exists a need to be able to keep the reply flow of an HTTP communication open in order to send portions of an overall response to a client as they become available. In other words, there exists a need to be able to receive/send multiple portions of an overall response without having to receive/send several requests for such portions.

BRIEF SUMMARY OF THE INVENTION

The above-identified deficiencies and drawbacks of current HTTP request-response type communications are over-come by exemplary embodiments of the present invention. For example, the present invention provides for transferring an HTTP response as a plurality of different portions in order to conserve valuable system resources associated with validating and a corresponding HTTP request.

Exemplary embodiments provide for sending a request message over an HTTP request flow for establishing a communication between endpoints in a distributed system. A first portion of a response is received over a corresponding HTTP reply flow at a first time period. The HTTP reply flow is then kept open in order to receive additional portions of the response. Without sending another request message, a second portion of the response is received over the HTTP reply flow at a second time period different from the first time period.

Other example embodiments provide for receiving a request message over an HTTP request flow for establishing a communication between endpoints in a distributed system. A first portion of a response is received over a corresponding HTTP reply flow at a first time period. Without receiving another request message, a second portion of the response is sent over the HTTP reply flow at a second time period different from the first time period.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to methods, systems and computer program products for transferring an HTTP response between endpoints as a plurality of different portions in order to conserve valuable system resources. The embodiments of the present invention may comprise a special purpose or general-purpose computer including various computer hardware, as discussed in greater detail below.

The present invention provides for keeping an HTTP reply flow for a communication open such that messages or portions of an overall response may be sent across the HTTP reply flow. As the various portions of the overall response become available at a corresponding service endpoint, the service appropriately encapsulates the messages and sends them to the requesting endpoint. The encapsulation will typically be private to each service and its specific details are not core to this invention. Nevertheless, what is important is that there is an agreed manner in which to read a fraction or portion of a response and determine the boundaries of the encapsulated messages. Accordingly, as a result of one request, the response is in effect a stream of portions of an overall response each of which comes as a fraction of the total request.

The recipient or requesting endpoint of the response is then capable of reading the available portions of the response and appropriately decodes the embedded portions and is free to process these as appropriate. Accordingly, even though the complete HTTP response has not been received, the requesting endpoint can begin work based on each of the embedded portions or messages that it has received. In addition, because only one request is made for several portions of a response valuable system resource are reserved for only requiring one authentication and/or validation of a requesting endpoint.

Figure 1A:
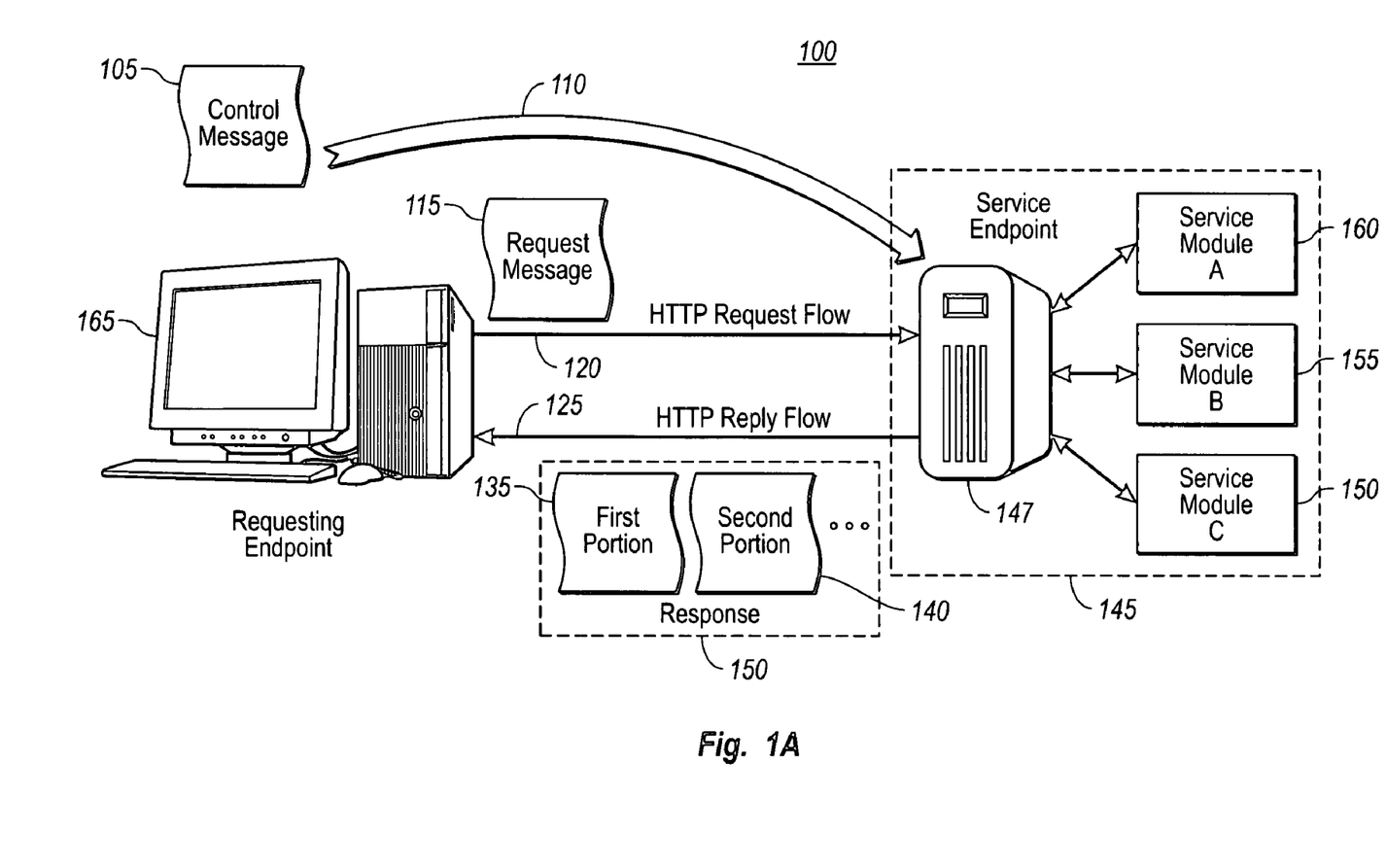
FIG. 1A illustrates a message exchange pattern using an extended HTTP reply flow in accordance with example embodiments of the present invention.

FIG. 1A illustrates some of the advantageous embodiments described above. As can be seen, a distributed system 100 includes a requesting endpoint 165 and a service endpoint 145 that can include several service modules 147, 150, 155, 160. In one embodiment, requesting endpoint 165 sends a request message 115 over an HTTP request flow 120 in order to establish a communication with service endpoint 145. The request message 115 will typically include the appropriate credentials in order to authenticate the requesting endpoint 165. In addition, other ways of authenticating are also available to the present invention. For example, the requesting endpoint may establish a shared secret or other way to authenticate the request message 115. In addition, any well known type of credential (e.g., token, shared secret, encryption,: etc.) is also available to the presenting invention. Accordingly, any particular way to authenticate and/or type of credential as described herein are used for illustrative purposes only and are not meant to limit or otherwise narrow the scope of the present invention.

Provided that at least the requesting endpoint 165 has appropriately authenticated (and provided that the endpoints support and have agreed on an encapsulation format as described below), portions 135, 140 of an overall response 150 may be sent from service endpoint 145 to the requesting endpoint 165 as they become available. For example, a first portion of the response 150 may be sent across the HTTP reply flow 125 at a first time period and when a second portion 140 of the response 150 becomes available, at a second time period, it can also be sent across the same HTTP reply flow 125 provided that requesting endpoint 165 keeps the HTTP reply flow 125 open.

Note that prior to any type of real exchange for a communication, example embodiments provide for ensuring that the two endpoints 165, 145 support keeping the reply flow open for an HTTP reply flow 125. Such validation allows the two endpoints 165, 145 to agree upon some type of encoding for keeping the reply flow 125 open during the communication. Accordingly, the packaging of the portions 135, 140 will typically be private to the requesting 165 and service 145 endpoints. Further, the agreement may be dynamic in nature and the endpoints 165, 145 may agree to a different type of encoding during a separate communication. In addition, the encoding may be predetermined, in which case such validation and dynamically agreed upon encoding is not necessary.

One example of an agreed upon standard for encapsulating uses the header portions of messages, e.g., eXstensible Markup Language (XML) documents. In this example, the service endpoint 145 may continually send portions 135, 140 across the HTTP reply flow 125 without including an "end message" header until, as described in greater detail below, one or more events occur. Nevertheless, the body of the message needs to be encoded such that the requesting endpoint 165 understands that the different portions 135, 140 are all part of the overall response 150.

Also note that the portions 135, 140 of the overall response 150 are arbitrary data in that they may be of varying size and data types, even within the same response. For example, one portion 135 may be streamed data will another portion 140 may be a single message. Further, other data types and formats are also available to the present invention. Accordingly, any particular type or formatting of messages are used for illustrative purposes only and are not meant to limit or otherwise narrow the scope of the present invention unless explicitly claimed.

There are several advantages and reasons one might want to keep a reply flow 125 of an HTTP request-reply communication open as described above. For example, a service endpoint 145 may desire to send more than one response to a requesting endpoint 165 when the complete reply takes time to produce, but fractions of the reply are available at an earlier time. Such may be the case when a requesting endpoint 165 wishes to purchase an item from the service endpoint 145. Upon receiving the request message 115, service endpoint 145 may initially send a first portion 135 indicating to the requesting endpoint 165 that the request message 115 was received. Thereafter, service endpoint 145 may validate credit card or other personal information at some subsequent time and send a second portion 140 of the overall response 150 to the requesting endpoint 165 confirming the personal information. When the product is finally shipped to the user, service endpoint 145 may send a subsequent portion 135, 140 of the overall response 150 to the requesting endpoint 165 indicating that the item has been shipped. Any other subsequent portions 135, 140 of the response 150 such as tracking or other information maybe sent as portions 135, 140 the information as they become available to the service endpoint 145.

Another reason for keeping the HTTP reply flow 125 open is that the complete response 150 may be a combination of messages coming from different sources such as services modules A-C 160, 155, 150. Similarly, the request 115 may be a collection of request from the different service modules A-C 160, 155, 150. In either case, the service endpoint 145 may obtain or gather information from several service modules, 160, 155, 150. For example, the single server 147 may utilize services provided from other service modules 160, 155, 150 and include these as portions 135, 140 of overall response 150. For instance, in the example given above, service endpoint 145 may validate the credit card information or other personal information through service module A 160; receive the delivery status from service module B 155; and retrieve tracking information from service module C 150. As these portions of information become available, server 147 can act as a proxy or router for the various portions 135, 140 and transfer them across the HTTP reply flow 125 as previously described.

As alluded to above, how the server 147 knows to retrieve the information from the various modules 160, 155, 150 within service endpoint 145 may vary. For example, with an appropriate agreed upon encoding, the requesting endpoint 165 may send a collection of endpoint references, e.g., within the request message 115 identifying the different portions 135, 140 or services to retrieve from the various service modules 160, 155, 150. Server 147 may then make the appropriate inquiries to the various service modules 160, 155, 150 and as the service modules 160, 155, 150 process and send back the appropriate responses, server 147 may send these as portions 130, 145 of the overall response 150 across the HTTP reply flow 125.

Alternatively (or possibly even in conjunction), a single request message 115 directed to the server 147 may recognize that various portions 130, 145 are needed from various service modules 160, 155, 150 within the service endpoint 145 and can automatically retrieve them as appropriate. Other processes for identifying and retrieving portions of an overall response 150 are also available to the present invention. Also note that only three service modules 160, 155, 150 are shown within service endpoint 145; however, any number of services or service modules 160, 155, 150 are available to the present invention. Accordingly, any specific description of referencing a service module 160, 155, 150 or service endpoint 145 or any particular number of service modules 160, 155, 150 as described herein is used for used for illustrative purposes only and it is not meant to limit or otherwise narrow the scope of the present invention unless explicitly claimed.

Still another reason for keeping the reply flow 125 of the HTTP communication open may be in order to accommodate devices or endpoints 165, 145 with limited buffer space or to support un-buffered communications. In this embodiment, when a response is a large set of data and the endpoints want to avoid buffering the entire data set into memory, smaller portions 135, 140 of the overall response can be periodically or asymmetrically sent across the HTTP reply flow and immediately processed to avoid buffering. Such may be desirable in the case of streaming audio or video or for system with limited system resources.

Note that at any time the requesting endpoint 165 may break the connection or communication with the service endpoint 145 in accordance with standard HTTP protocol. This connection cutoff may be, e.g., an expression that either too much information has been delivered and/or that a failure has occurred. Similarly, the service endpoint 145 has the ability to stop producing or encapsulating portions 135, 140 of the overall response 150 and finish up the original request 115. Accordingly, either of the endpoints 165, 145 in the communication have the ability to sever the interaction within the typical set of mechanisms at their disposal. That is, no new HTTP mechanisms are required for severing connections or closing the HTTP reply flow 125.

In addition to the overall embodiment of messages encapsulated within a single response 150 (that is portions 135, 140 of overall response 150), other exemplary embodiments provide for managing the communication between the endpoints 165, 145, through control messages 105. Control message 105 may be one or more of a collection of messages that help both endpoints 165, 145 manage such an encapsulated stream interaction. Each control message 105 may be modeled as a request-response pair of messages, which fits nicely into the HTTP transport model. Note that typically control messages should be transmitted 110 using a different HTTP request than the one producing the response 150 over the HTTP reply flow 125. Although an initial request message 115 may include control information at the initial stage of the communication, additional control information 105 will need to be sent over another request-response transport 110.

Control messages 105 may also be sent out of bound across other types of communication transports 110 as long as they identify the particular communication between requesting endpoint 165 and service endpoint 145. Further, other processes and transports for sending control message 105 across various transports 110 to the service endpoint 145 are also available to the present invention. Accordingly, any specific use of a process or particular transport for sending control messages 105 to the service endpoint 145 is used for used for illustrative purposes only and it is not meant to limit or otherwise narrow the scope of the present invention.

There are several types of control messages 105 that are available to the present invention. For example, one control message 105 may be an "is it okay to bulk" message. This control message 105 is used to determine whether an endpoint can accept a bulk, streamed, response 150. That is, such control message 105 may be used in the initial states of establishing a communication in order to determine whether such communication is supported by a particular endpoint 165, 145 and what type of encapsulation to use. Another control message 105 may be a "suspend" message, wherein the requesting endpoint 165 wishes to temporarily stop receiving encapsulated portions 135, 140 of the response 150. Anther control message 105 may be a "resume" message, wherein the requesting endpoint 165 wishes to restart receiving encapsulated messages of response 150. Yet another control message 105 may be a "ping," wherein one endpoint 165, 145 wishes to determine that the other endpoint 165, 145 is still operational.

Other control messages 105 may include "multiplex initiation" message. This particular control message 105 allows a service endpoint 145 (and more specifically a server 147) to communicate a collection of endpoint references that it is willing to serve as an intermediate router or proxy for. Accordingly, messages for any such endpoint references get sent as encapsulated portions as previously described via the server 147.

Another control message 105 maybe a "disconnection" message although this is described as a message, it may be instead a simple message header containing an endpoint reference that identifies the HTTP response 150 to enable the requesting endpoint 165 to refer to response 150 or the overall communication between the endpoints 145, 165 on other channels, e.g., 110. As one can see, this data has multiple usages for sending control messages 105 and other information between various endpoints.

Other well known control messages 105 and or headers for controlling a communication are also available to the present invention. Accordingly, the above described list of control messages 105 is not meant to be inclusive, and any particular reference to a particular control message 105 is used for illustrative purposes only and is not meant to limit or otherwise narrow the scope of the present invention unless explicitly claimed.

Figure 1B:
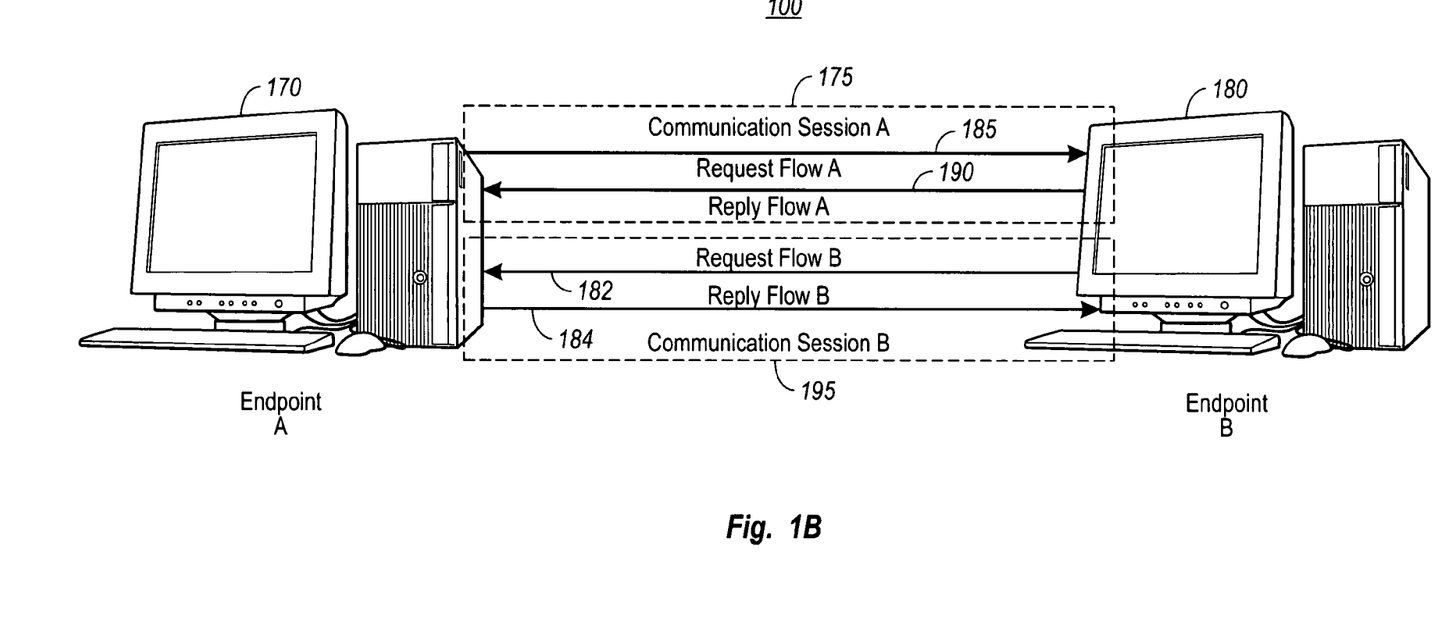
FIG. 1B illustrates a two-way communication session between endpoints in a distributed system by using two extended HTTP reply flows in accordance with example embodiments of the present invention.

Other exemplary embodiments provide for a two-way communication exchange pattern among two endpoint services. In such embodiment, the above outlined process for establishing a communication may be done twice, with each endpoint acting as both requesting 165 and service 145 endpoints. For example, as shown in FIG. 1B distributed system 100 includes endpoint A 170 and endpoint B 180. A first communication session A 175 can be established by sending from endpoint A 170 a request over a request flow A 185, wherein subsequent portions of an overall response are received over a reply flow A 190 as previously described.

Similarly, endpoint B may establish a communication session B 195 by sending a request message over a request flow B 182 and receiving subsequent portions of an overall response across a reply flow B 184 in accordance with exemplary embodiments. In such instances, the two endpoints 170, 180 should typically coordinate which requests and portions of the overall responses correspond to the one-ways of the two-way communication.

The present invention may also be described in terms of methods comprising functional steps and/or non-functional acts. The following is a description of steps and/or acts that may be performed in practicing the present invention. Usually, functional steps describe the invention in terms of results that are accomplished whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use of steps and/or acts in the recitation of the claims and the following description for the flow charts of FIGS. 2 and 3 are used to indicate the desired specific use of such terms.

Figure 2:
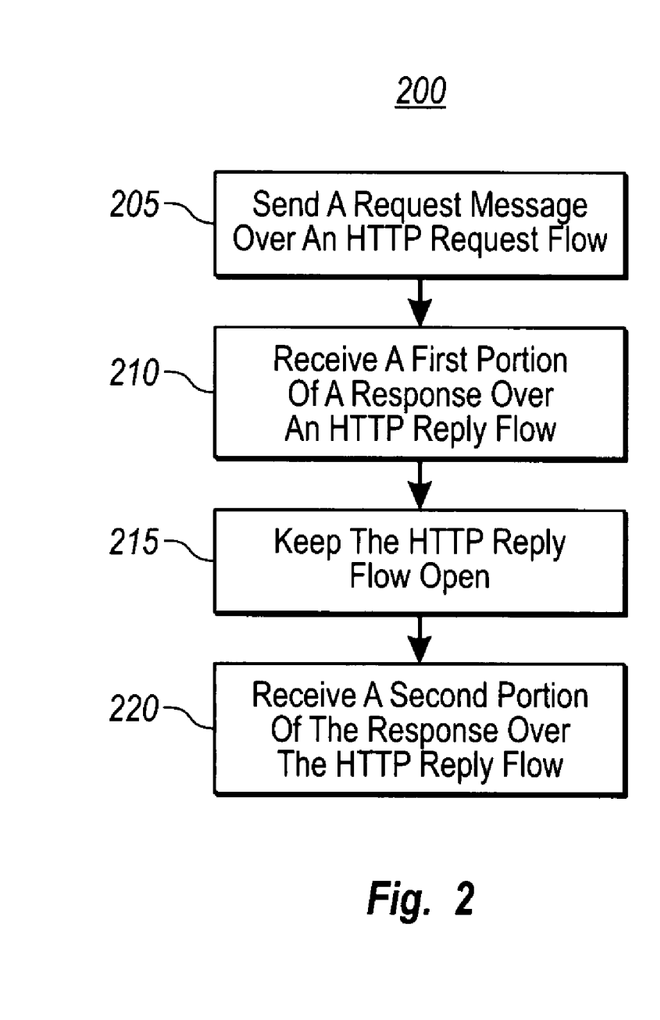
FIG. 2 and FIG. 3 illustrate example flow charts for transferring an HTTP response as a plurality of different portions in accordance with exemplary embodiments of the present invention.
Figure 3:
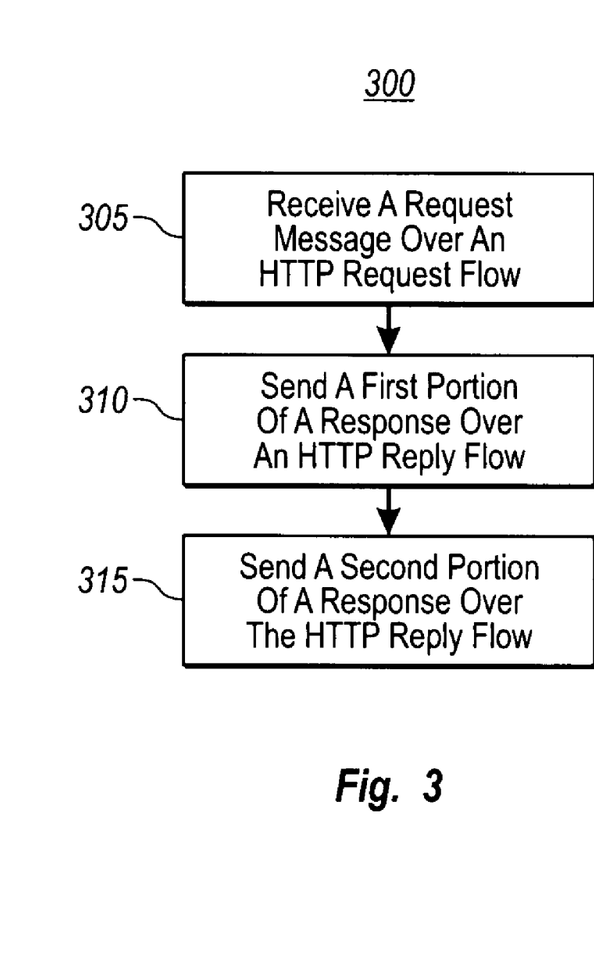

FIGS. 2 and 3 illustrate example flow charts for various exemplary embodiments of the present invention. The following description of FIGS. 2 and 3 will occasionally refer to corresponding elements from FIGS. 1A and 1B. Although reference may be made to a specific element from these Figures, such elements are used for illustrative purposes only and they are not meant to limit or otherwise narrow the scope of the present invention unless explicitly claimed.

FIG. 2 illustrates an example flow chart of a method 200 of transferring an HTTP response as a plurality of different portions in order to conserve valuable system resources associated with validating authorizing a corresponding request. Note that method 200 is from the prospective of a requesting endpoint 165 and includes an act of sending 205 a request message over an HTTP request flow. For example, requesting endpoint 165 may send request message 115 over an HTTP reply flow 125 for establishing a communication with the service endpoint 145 in distributed system 100. The request message 115 may contain control information, e.g., control message 105 for controlling the communication. Typically, however, the control messages will be sent in a separate communication in order for managing the established communication between requesting endpoint 165 and service endpoint 145. As previously described, the control messages may be one or more of an "is it okay to bulk," "suspended," "resume," "ping," "reconnect," "multiplex initiation," "this connection," etc.

After sending a request message, method 200 includes an act of receiving 210 a first portion of a response over an HTTP reply flow 125. For example, requesting endpoint 165 may receive a first portion 135 of a response over a corresponding HTTP reply flow 125, which is received at a first time period. Method 200 also includes an act of keeping 215 the HTTP reply flow 125 open. For example, requesting endpoint 165 may keep the HTTP reply flow 125 open in order to receive addition portions of the response 150. Without sending another request message, method 200 also includes an act of receiving 220 a second portion of the response over the HTTP reply flow 125. For example, requesting endpoint 165 may receive a second portion 140 of the response 150 over the HTTP reply flow 125, wherein the second portion is received at a second time period different from the first time period.

The first 135 and second 140 portions may be received asynchronously, i.e., at arbitrary intervals. Further, these portions 135, 140 may either be streamed, individual messages, or both, that make up the over all response 150. Further, the first portion 135 and second portion 140 may be discrete messages that were processed from separate service modules, 160, 155, 150 within in the distributed system 100. The first and second portions 135, 140 may be received from a single service 147 or server that requested the discrete messages 135, 140 from the separate service modules 160, 155, 150 using endpoint references sent from requesting endpoint 165. These endpoint references may be included in the request message 115. Alternatively, or in conjunction, the service endpoint 145 may send the endpoint references that it supports in a control message 105 to the requesting endpoint 165. Further, the endpoint references may be sent in a control message 105 over a communication transport separate from the HTTP reply flow 125.

As mentioned above, a two-way communication may be established between the two endpoints in the distributed system 100. In such an embodiment, if endpoint A 170 within FIG. 1B is the requesting endpoint 165 from FIG. 1A; and endpoint B 180 within FIG. 1B is the service endpoint 180 from FIG. 1A then following an establishment of a first communication session A 175 further embodiments provide for the following. Endpoint A 170 may receive a second request message over a second HTTP reply flow (e.g., request flow B 182) for establishing a two-way communication session between endpoint 170, 180 within a distributed system 100. Thereafter, endpoint A 170 may send a first portion of a second response over a corresponding second HTTP reply flow (e.g., reply flow B 184) at a third time period. Without receiving another request message, endpoint A 170 may send a second portion of the second response over the second HTTP reply flow (e.g., reply flow B 184) at a fourth time period different from the third period.

From the service endpoint 145, FIG. 3 illustrates a method 300 of transferring an HTTP response as a plurality of different portions in accordance with exemplary embodiments of the present invention. Method 300 includes an act of receiving 305 a request message over an HTTP reply flow. For example, service endpoint 145 may receive request message 115 from requesting endpoint 165 over an HTTP reply flow 125. Method 300 also includes an act of sending 310 a first portion of a response over an HTTP reply flow. For example, service endpoint 145 may send a first portion 135 of response 150 over HTTP reply flow 125 at a first time period. Method 300 also includes an act of sending 315 a second portion of a response over the HTTP reply flow. For example, service endpoint 145 may send a second potion 140 of the response 150 over the HTTP reply flow 125 at a second time period different from the first time period. Note that the other exemplary embodiments as previously described above may also apply to method 300.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 4:
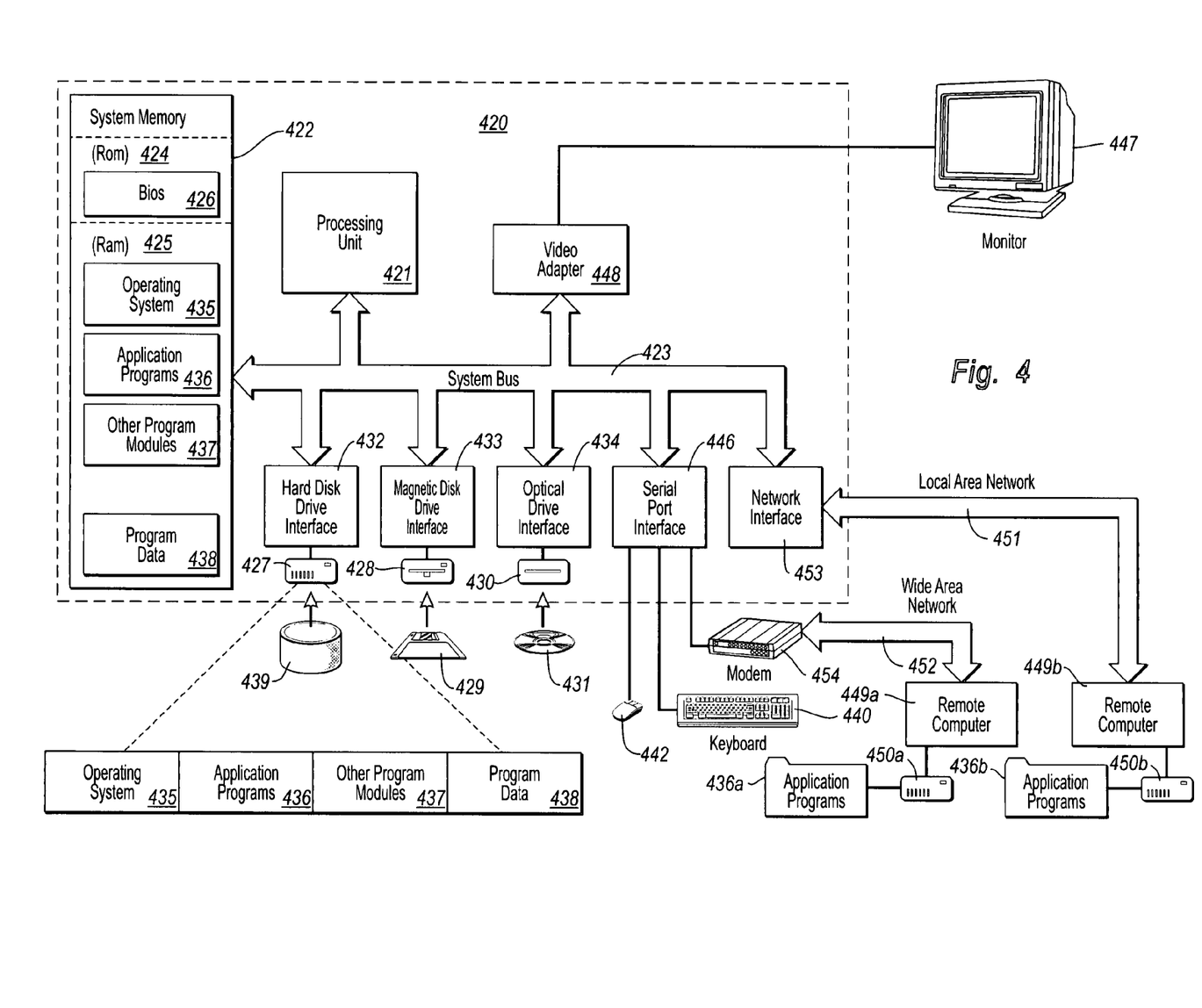
FIG. 4 illustrates an example system that provides a suitable operating environment for the present invention.

FIG. 4 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by and remote processing devices that are linked (either by hardwired links, wireless links, or by a combination of hardwired or wireless links) through a communications network. In a distributed computing environment, program modules may be located in both and remote memory storage devices.

With reference to FIG. 4, an exemplary system for implementing the invention includes a general purpose computing device in the form of a conventional computer 420, including a processing unit 421, a system memory 422, and a system bus 423 that couples various system components including the system memory 422 to the processing unit 421. The system bus 423 may be any of several types of bus structures including a memory bus or memory controller, a peripheral bus, and a bus using any of a variety of bus architectures. The system memory includes read only memory (ROM) 424 and random access memory (RAM) 425. A basic input/output system (BIOS) 426, containing the basic routines that help transfer information between elements within the computer 420, such as during start-up, may be stored in ROM 424.

The computer 420 may also include a magnetic hard disk drive 427 for reading from and writing to a magnetic hard disk 439, a magnetic disk drive 428 for reading from or writing to a removable magnetic disk 429, and an optical disk drive 430 for reading from or writing to removable optical disk 431 such as a CD-ROM or other optical media. The magnetic hard disk drive 427, magnetic disk drive 428, and optical disk drive 430 are connected to the system bus 423 by a hard disk drive interface 432, a magnetic disk drive-interface 433, and an optical drive interface 434, respectively. The drives and their associated computer-readable media provide nonvolatile storage of computer-executable instructions, data structures, program modules and other data for the computer 420. Although the exemplary environment described herein employs a magnetic hard disk 439, a removable magnetic disk 429 and a removable optical disk 431, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 439, magnetic disk 429, optical disk 431, ROM 424 or RAM 425, including an operating system 435, one or more application programs 436, other program modules 437, and program data 438. A user may enter commands and information into the computer 420 through keyboard 440, pointing device 442, or other input devices (not shown), such as a microphone, joy stick, game pad, satellite dish, scanner, or the like. These and other input devices are often connected to the processing unit 421 through a serial port interface 446 coupled to system bus 423. Alternatively, the input devices may be connected by other interfaces, such as a parallel port, a game port or a universal serial bus (USB). A monitor 447 or another display device is also connected to system bus 423 via an interface, such as video adapter 448. In addition to the monitor, personal computers typically include other peripheral output devices (not shown), such as speakers and printers.

The computer 420 may operate in a networked environment using logical connections to one or more remote computers, such as remote computers 449a and 449b. Remote computers 449a and 449b may each be another personal computer, a server, a router, a network PC, a peer device or other common network node, and typically include many or all of the elements described above relative to the computer 420, although only memory storage devices 450a and 450b and their associated application programs 436a and 436b have been illustrated in FIG. 4. The logical connections depicted in FIG. 4 include a area network (LAN) 451 and a wide area network (WAN) 452 that are presented here by way of example and not limitation. Such networking environments are commonplace in office-wide or enterprise-wide computer networks, intranets and the Internet.

When used in a LAN networking environment, the computer 420 is connected to the network 451 through a network interface or adapter 453. When used in a WAN networking environment, the computer 420 may include a modem 454, a wireless link, or other means for establishing communications over the wide area network 452, such as the Internet. The modem 454, which may be internal or external, is connected to the system bus 423 via the serial port interface 446. In a networked environment, program modules depicted relative to the computer 420, or portions thereof, may be stored in the remote memory storage device. It will be appreciated that the network connections shown are exemplary and other means of establishing-communications over wide area network 452 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a distributed system that utilizes an HTTP request-response transport, a method of transferring an HTTP response as a plurality of different portions in order to conserve valuable system resources associated with validating and authorizing a corresponding HTTP request, the method comprising acts of:

sending a request message over an HTTP request flow for establishing a communication between endpoints in a distributed system;

receiving a first portion of a response over a corresponding HTTP reply flow, the first portion received at a first time period;

keeping the HTTP reply flow open in order to receive additional portions of the response;

without sending another request message, receiving a second portion of the response over the HTTP reply flow, the second portion received at a second time period different from the first time period; and wherein one or more control messages are sent between the endpoints in a separate communication session in order to manage the established communication.

2. The method of claim 1, wherein the first and second portions are received asynchronously.

3. The method of claim 1, wherein the first and second portions are discrete messages that were processed from separate service modules within the distributed system.

4. The method of claim 3, wherein the first and second portions are received from a single service that requested the discrete messages from the separate service modules using endpoint references sent from a requesting endpoint in the distributed system.

5. The method of claim 4, wherein the endpoint references are included in the request message.

6. The method of claim 4, wherein the endpoint references are sent in a control message over a communication transport separate from the HTTP request flow.

7. The method of claim 1, wherein the first and second portions are received at a client from a service, and wherein the method further includes the acts of:

receiving from the service a second request message over a second HTTP request flow for establishing a two-way communication session between the client and the service in a distributed system;

sending a first portion of a second response over a corresponding second HTTP reply flow, the first portion of the second response sent at a third time period; and without receiving another request message, sending a second portion of the second response over the second HTTP reply flow, the second portion sent at a fourth time period different from the third time period.

8. In a distributed system that utilizes an HTTP request-response transport, a method of transferring an HTTP response as a plurality of different portions in order to conserve valuable system resources associated with validating and authorizing a corresponding HTTP request, the method comprising acts of:

receiving a request message over an HTTP request flow for establishing a communication between endpoints in a distributed system;

sending a first portion of a response over a corresponding HTTP reply flow, the first portion sent at a first time period; and without receiving another request message, sending a second portion of the response over the HTTP reply flow, the second portion sent at a second time period different from the first time period wherein the first and second portions are sent to a client from a service, and wherein the method further includes the acts of:

sending to the client a second request message over a second HTTP request flow for establishing a two-way communication session between the client and the service in a distributed system;

receiving a first portion of a second response over a corresponding second HTTP reply flow, the first portion of the second response sent at a third time period; and without sending another request message, receiving a second portion of the second response over the second HTTP reply flow, the second portion sent at a fourth time period different from the third time period; and wherein one or more control messages are sent between the endpoints in a separate communication session in order to manage the established communication.

9. The method of claim 8, wherein the first and second portions are discrete messages processed and received from a single service module.

10. The method of claim 8 wherein the one or more control messages are chosen from "is it ok to bulk," "suspend," "resume," "ping," "reconnect," "multiplex initiation," or "this connection."

11. The method of claim 8 wherein the first portion, the second portion, or both, are either streamed or individual messages.

12. In a distributed system that utilizes an HTTP request-response transport, a computer readable storage medium having computer executable instructions that when executed cause a computer to implement a method of transferring an HTTP response as a plurality of different portions in order to conserve valuable system resources associated with validating and authorizing a corresponding HTTP request, the computer readable medium further comprising computer executable instructions that when executed can cause the messaging system to perform the following:

send a request message over an HTTP request flow for establishing a communication between endpoints in a distributed system;

receive a first portion of a response over a corresponding HTTP reply flow, the first portion received at a first time period;

keep the HTTP reply flow open in order to receive additional portions of the response;

without sending another request message, receive a second portion of the response over the HTTP reply flow, the second portion received at a second time period different from the first time period; and wherein one or more control messages are sent between the endpoints in a separate communication session in order to manage the established communication.

13. The computer readable storage medium of claim 12, wherein the first and second portions are discrete messages that were processed from separate service modules within the distributed system.

14. The computer readable storage medium of claim 12, wherein the first and second portions are discrete messages processed and received from a single service module.

15. The computer readable storage medium of claim 12, wherein the first and second portions are received at a client from a service, and wherein the computer program product further comprising computer executable instructions that can cause the messaging system to perform the following:

receive from the service a second request message over a second HTTP request flow for establishing a two-way communication session between the client and the service in a distributed system;

send a first portion of a second response over a corresponding second HTTP reply flow, the first portion of the second response sent at a third time period; and without receiving another request message, send a second portion of the second response over the second HTTP reply flow, the second portion sent at a fourth time period different from the third time period.

16. The computer readable storage medium of claim 12, wherein the one or more control messages are chosen from "is it ok to bulk" "suspend," "resume," "ping," "reconnect," "multiplex initiation," or "this connection."

* * * * *

UNITED STATES PATENT AND TRADEMARK OFFICE
CERTIFICATE OF CORRECTION

| | | |
|---|---|---|
| PATENT NO. | : 7,526,801 B2 | Page 1 of 1 |
| APPLICATION NO. | : 11/031856 | |
| DATED | : April 28, 2009 | |
| INVENTOR(S) | : Keith W. Ballinger et al. | |

It is certified that error appears in the above-identified patent and that said Letters Patent is hereby corrected as shown below:

In column 14, line 35, in Claim 16, delete "bulk"" and insert -- bulk," --, therefor.

Signed and Sealed this
Nineteenth Day of July, 2011

David J. Kappos
*Director of the United States Patent and Trademark Office*